Jan. 20, 1931.　　　A. G. DESCHENES ET AL　　　1,789,428
NUT COOKING MACHINE
Filed Dec. 1, 1926　　　3 Sheets-Sheet 1
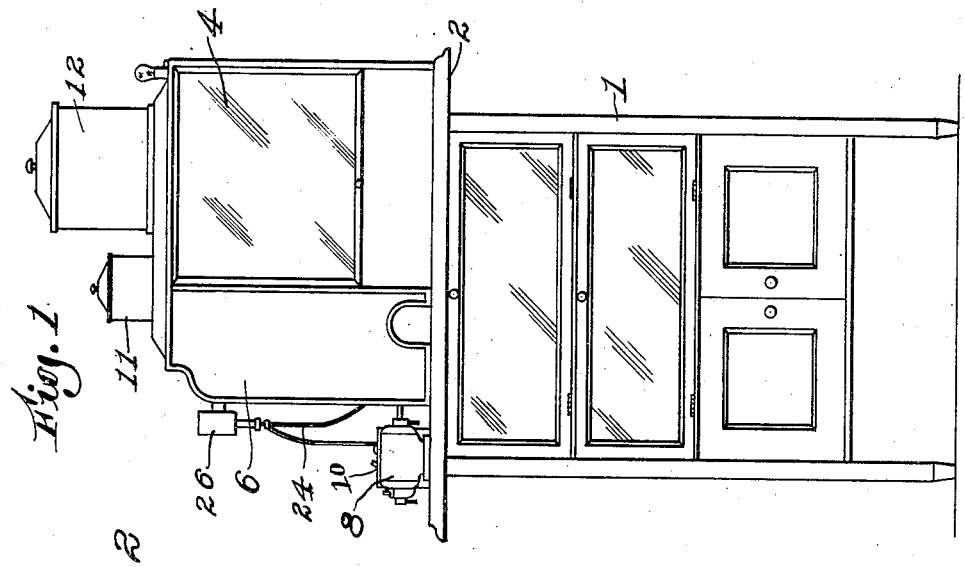
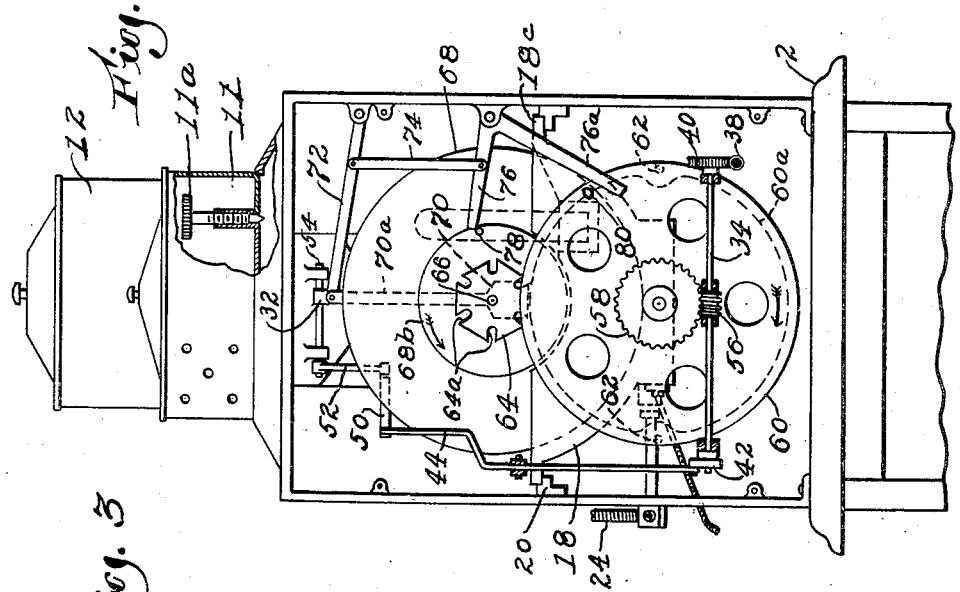
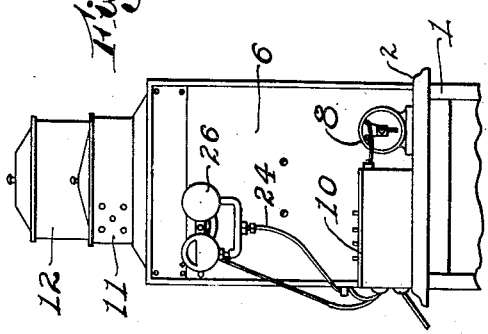
Adelard G. Deschenes
Eugene A. Brunelle
Inventors
by Harry D. Peck
Attorney

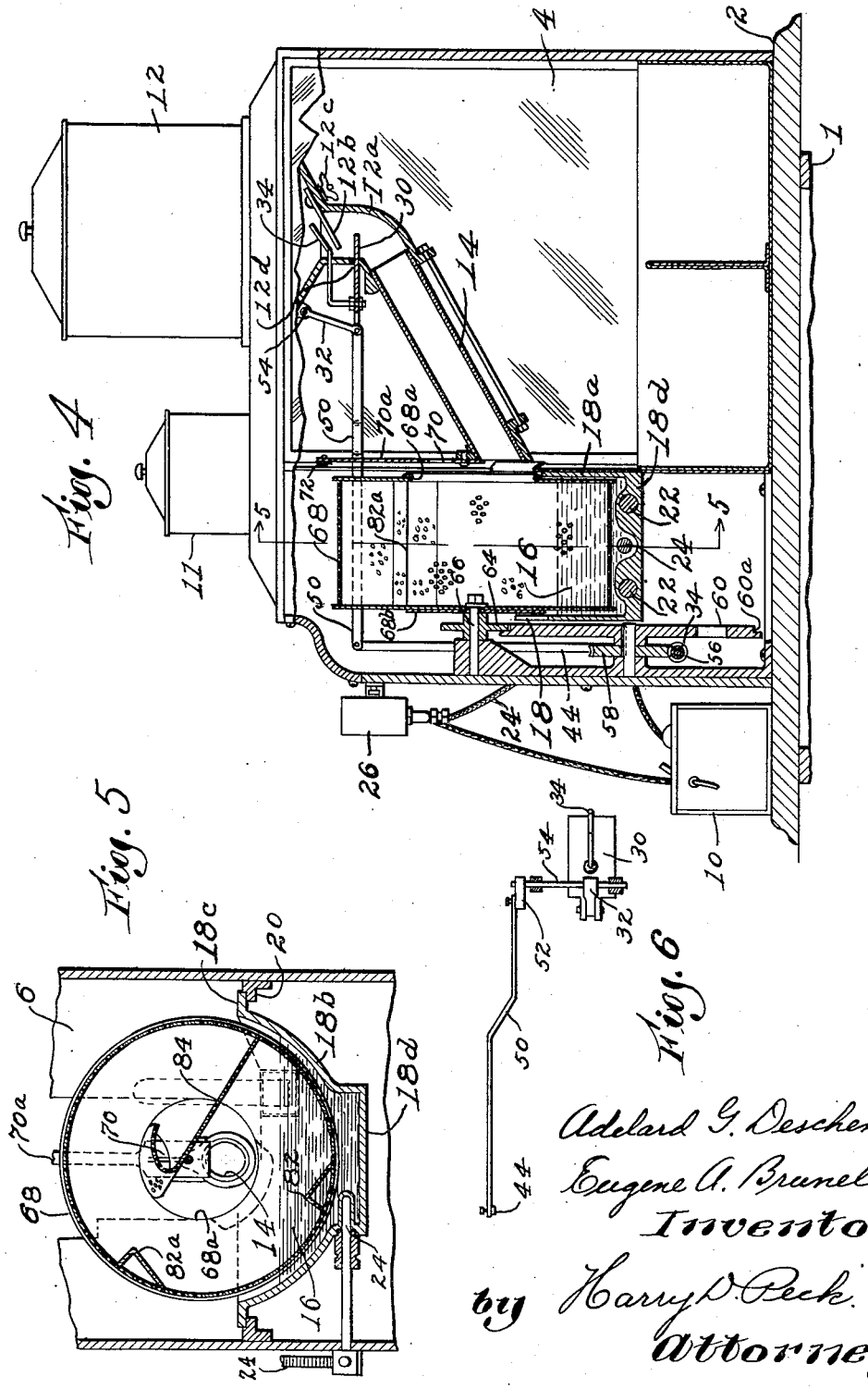

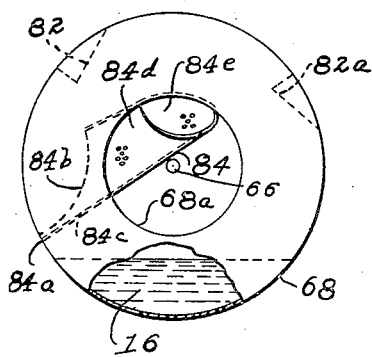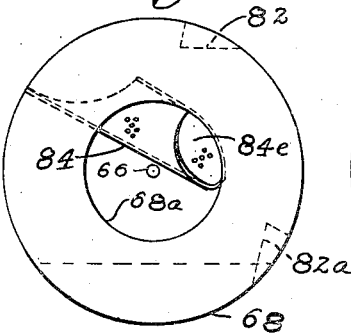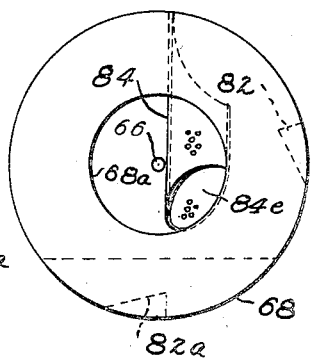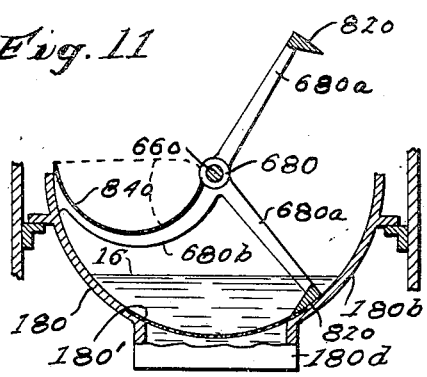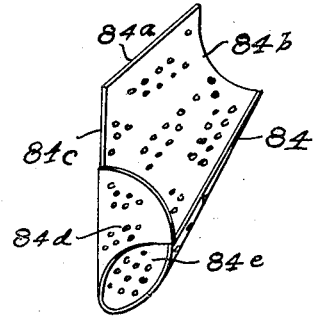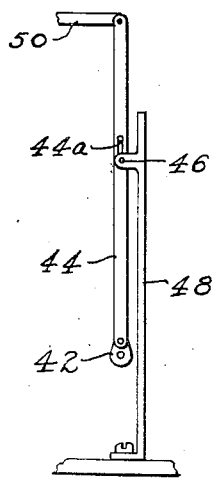

Patented Jan. 20, 1931

1,789,428

UNITED STATES PATENT OFFICE

ADELARD G. DESCHENES AND EUGENE A. BRUNELLE, OF SOMERSWORTH, NEW HAMPSHIRE

NUT-COOKING MACHINE

Application filed December 1, 1926. Serial No. 151,933.

This invention relates to improvements in nut cooking machines. More especially it relates to improved features in automatic machines wherein predetermined quantities of nuts are fed intermittently from a hopper at the top of the machine to heated liquid below, and allowed to cook, being subsequently withdrawn from the liquid, drained and discharged from the machine. A type of machine suitable for this purpose has already been disclosed in United States Letters Patent No. 1,625,797 granted April 26, 1927, to Adelard G. Deschenes.

It is an object of the present invention to provide improvements in the type of machine shown in said patent and in particular to provide a fixed tank for the cooking liquid, to provide movable foraminous means in said tank for withdrawing the cooked nuts, to provide thermostatic control for the cooking liquid, and to provide improved operating mechanism more particularly described hereinafter.

The accompanying drawings show a machine illustrative of the best mode in which we have contemplated applying the principles of our invention. It is intended that the patent shall cover by suitable expression in the appended claims whatever features of patentable novelty exist in the invention disclosed.

In the drawings:

Figure 1 is a side elevation of the machine and a supporting cabinet therefor;

Figure 2 is a rear elevation, partly in section, with the end cover plate removed;

Figure 3 is a rear elevation;

Figure 4 is a side elevation, being for the most part a longitudinal medial section;

Figure 5 is a rear elevation in section on line 5—5 of Figure 4;

Figure 6 is a plan view of part of the nut feeding mechanism;

Figures 7, 8 and 9 are front elevations of the foraminous means for withdrawing the nuts from the liquid;

Figure 10 is a perspective of the scoop employed in the foraminous means of Figures 7, 8 and 9;

Figure 11 is an elevation, in section, showing a modification; and

Figure 12 is an elevation of part of the operating mechanism.

Referring more particularly to the drawings, a cabinet 1—having storage space for supplies such as raw nuts, oil, paper bags, salt, etc.—supports the nut cooking machine which comprises a base 2, a glass-walled apartment 4, and a cooking compartment 6. A motor 8 and a switch box 10 are arranged on the base outside the compartments and on the top is a reservoir 11 for cooking liquid and a supply hopper 12 containing nuts to be fed automatically through chute 14 to liquid 16 in a tank 18 fixed in the lower portion of the cooking compartment. In the preferred form this tank is a sort of trough, having vertical side walls $18^a$ and a curved bottom $18^b$ with end flanges $18^c$ resting on brackets 20, and with an offset portion $18^d$ at the lower part in which are encased electrical heating units 22. Extending into the offset portion $18^d$, between the units, is a thermoconductive element 24 leading to a thermostatic control device 26 mounted on the back of the machine. This device regulates the current flowing through the heating units and can be adjusted to maintain any desired temperature of the cooking liquid. The latter is supplied from the reservoir 11 to the tank 18 below according to the setting of the drip valve $11^a$.

At the base of the hopper 12 is a short vertical duct $12^a$ having a curved end connecting with the inclined chute 14, and at the entrance to this duct is a plate valve $12^b$ adjustably secured in position on an inclined side of the hopper base by a thumb screw $12^c$ passing through a slot in the valve. This valve is set at an inclination nearby across the vertical duct 12ᵃ so that but a small quantity of nuts can pass thererin. Close by the valve opening is a horizontal plate 30 having one end pivotally connected to a swinging arm 32, and having its other end projecting through a slot 12ᵈ in the vertical duct. Attached to the plate 30 is a rod 34 which extends upward from the plate and then bends to pass through a suitable hole in the vertical duct to bring its curved end just above the valve 12ᵇ. The plate and rod continuously move back and forth across the vertical duct, the rod stirring the nuts above the valve 12ᵇ to prevent clogging at the valve and the plate 30 carrying the nuts which have passed the valve 12ᵇ away from the opening and subsequently dropping them into chute 14. This movement of the plate 30 and rod 34 is accomplished by a system of links and levers having connection with the main shaft 34 driven by motor 8 through worm 38 and gear 40. At the end of the shaft 34 is a crank 42 carrying a sort of floating lever 44 (see Figure 12) which has a slot 44ᵃ midway of its length through which passes its fulcrum pin 46 mounted on the fixed standard 48. The upper end of the lever is connected by link 50 with an arm 52 fast on the short horizontal shaft 54 (see Figure 6). The latter also carries the arm 32 that is pivotally joined to plate 30. As the main shaft rotates, the throw of the crank 42 is transmitted by the aforesaid linkage to the plate 30 and rod 34.

A worm 56 midway of main shaft 34 meshes with a gear 58 secured to the circular plate 60. The edge of the latter is cut back on one side to form a circular cam surface 60ᵃ which, at diametrically opposite points, is further cut back around pins 62 which project from the side of the plate. As the plate rotates these pins engage notches 64ᵃ in a six sided wheel 64 mounted on a shaft 66 vertically over the axis of the cam plate 60. During a complete rotation of the latter the wheel 64 and its shaft 66 are moved intermittently through one third of a rotation.

Secured to the inner end of this shaft 66 is a container adapted to receive the nuts. As here shown this container is in the form of a drum 68 preferably made of foraminous material such as perforated sheet metal. The periphery of this drum is close by the curved bottom 18ᵇ of the liquid tank. (See Figure 5.) Consequently a part of the drum will always be submerged in the cooking liquid. The side of the drum opposite its mounting on the shaft 66 has an opening 68ᵃ and beside the lower portion of this opening is the end of chute 14.

A valve 70 closes the vertical end of this chute during most of the operation of the machine but at predetermined intervals is opened to allow the charge of nuts, which have been accumulating in the chute according to the setting of valve 12ᵇ, to enter the drum 66. This valve is a vertical plate having a reduced portion 70ᵃ extending upward into pivotal engagement with a lever 72. The latter is connected by a link 74 with a bell crank lever 76, one arm of which is positioned to be engaged by a pin 78 on the hub plate 68ᵇ of the drum. During one of the intermittent movements of the latter, the pin swings the bell crank 76, link 74 and lever 72 upward, thereby opening the valve 70. This position is that illustrated in the drawings in Figures 2, 4 and 5, just as the nuts are passing from chute 14 into the drum. Just before the end of the movement of the hub plate 68ᵇ during which the pin 78 engages lever 76, the lever slips off the pin whereupon the valve 70 and its associated levers and links can fall downward by force of gravity. To insure positive closing of this valve, however, the arm 76ᵃ of the bell crank lever in being swung upward by the pin 78, comes into the path of another pin 80 on the cam plate 60. If, for any reason the valve 70 has hesitated or become momentarily stuck, the engagement of pin 80 with the bell crank forces the valve to its closed position.

In falling from chute 14 into the cooking liquid the nuts come to rest on the portion of the foraminous drum which at that time is at the bottom side thereof. Preferably the nuts land just ahead or partly on an agitator 82 secured to the inner curved surface of the drum, so that when the next one or two intermittent steps of the drum occur this agitator will pass under the nuts tumbling them over its sharp upper edge and distributing them more or less across the drum. Similarly during the next two successive movements of the drum the second agitator 82ᵃ will have passed under the nuts again stirring them.

Inside the drum is a scoop 84 made of perforated material which extends between the side walls and has its forward or receiving edge 84ᵃ fastened to the curved wall of the drum. The inner, or rear edge 84ᵇ of the scoop is curved and is fastened to the closed wall of the drum. The opposite or front edge 84ᶜ of the drum extends from the edge 84ᵃ toward the axis of the drum, part of it being secured to the wall of the drum having the opening 68ᵃ, and the remainder continuing across the opening 68ᵇ and thence curving back upon itself around the edge of said opening. Part of this semicircular area defined by the edge 84ᶜ is covered by an end portion 84ᵈ of the scoop leaving a part 84ᵉ open. As the drum rotates (see Figures 7, 8 and 9) the scoop is passed through the liquid, and during one of the rests of the drum is in the position seen in Figure 7, where the nuts can drain. The next movement of the drum brings the scoop to the position shown in Figure 8, where the nut can more or less slide in the scoop toward the opening 84° and be further and completely drained of excess liquid. During the following movement of the drum the scoop reaches the position shown in Figure 9, and then the nuts can all slide from the scoop into the compartment 4. During the next movement of the drum the scoop passes clear of the end of chute 14, the valve 70 is raised, as heretofore explained, and the next charge of nuts to be cooked enters the drum.

In Figure 11 is shown a modification in which the tank 180 is provided at its bottom with a perforated partition 180' forming a continuous surface with the curved bottom walls 180$^b$. The liquid stands in the offset portion 180$^d$ and lower part of the tank as indicated. In this modification there are three arms mounted on a common hub 680 at each end of shaft 660. Two of these arms 680$^a$ are each connected with the corresponding arms at the other side by bars 820 which serve as agitators for the nuts, which in this case fall directly to the bottom of the tank. The third pair of arms 680$^b$ carry a perforated scoop 840 (shown partly in dotted outline) which can withdraw the nuts from the bottom of the tank and discharge them into the compartment 4.

The operation of the machine is continuous. The nuts are fed in predetermined quantities from the hopper into the cooking liquid, agitated while there being cooked, and subsequently withdrawn from the liquid, drained and discharged into the glass enclosed compartment where they may be salted and packaged for vending. The liquid is replenished in the tank by the constant drip from the reservoir and the temperature is maintained at the proper degree by the thermostatic control.

We claim as our invention:

1. A machine for cooking nuts and the like having, in combination, a compartment holding cooking liquid; means for feeding nuts to be cooked in said liquid; a perforated drum rotatable in said compartment and arranged to receive the nuts thus fed; a scoop in said drum and rotatable therewith for withdrawing the nuts from the liquid and discharging them from the compartment.

2. A machine for cooking nuts and the like, having, in combination, a compartment holding cooking liquids; means for feeding nuts to be cooked in said liquid; a perforated drum rotatable in said compartment and arranged to receive the nuts thus fed; a scoop in said drum and rotatable therewith for withdrawing the nuts from the liquid and discharging them from the compartment; and power means for rotating said drum.

3. A machine for cooking nuts and the like, comprising a fixed tank holding cooking liquid; means for feeding nuts to be cooked in said liquid; a movable shaft; means secured to said shaft for receiving the nuts from said feeding means and supporting them in said liquid while being cooked; said means being moved with said shaft to effect withdrawal of the nuts from the liquid and discharge of said nuts from said means; and means for moving said shaft.

4. A machine for cooking nuts and the like, comprising a fixed tank holding cooking liquid; means for feeding nuts to be cooked in said liquid; foraminous means mounted to rotate only about a single fixed axis and arranged to receive the nuts from said feeding means and support them in the liquid while being cooked; said foraminous means being rotatable about said axis to effect withdrawal of the nuts from the liquid and to effect their discharge from the machine; and means for rotating said foraminous means.

5. A machine for cooking nuts and the like, comprising a fixed tank holding cooking liquid; means for feeding nuts to be cooked in said liquid; a rotatable shaft; a perforated element secured to said shaft and rotatable in said tank arranged to receive the nuts thus fed; said element being adapted, during its rotation to effect withdrawal of the nuts from the liquid and to effect their discharge from the machine; and means to rotate said shaft.

6. A machine for cooking nuts and the like, comprising a fixed tank holding cooking liquid and having a cylindrical wall; means for feeding nuts to be cooked in said liquid; a movable shaft located at the axis of said wall; an element secured to said shaft and movable therewith in close proximity to said wall; said element being adapted to receive the nuts from the feeding means, support them while being cooked, withdraw them from the liquid and effect their discharge from the machine; and means for moving said shaft.

7. A machine for cooking nuts or the like comprising a tank holding cooking liquid; a movable shaft located at the axis of said tank; means secured to said shaft and movable therewith for receiving nuts to be cooked in said liquid and supporting them while being cooked; said means being capable during its movements of withdrawing the nuts from the tank and effecting their discharge from the machine.

8. A machine for cooking nuts and the like, comprising a movable shaft; an element secured thereto; a tank holding cooking liquid in which the said element moves; means to move said shaft and thereby move said element; the said element being capable of receiving the nuts to be cooked in said liquid, supporting them while they are being cooked, withdrawing them from the liquid and effecting their discharge from the machine.

9. A machine for cooking nuts and the like, comprising a tank holding cooking liquid; a shaft arranged at the axis of said tank and movable with respect thereto; means secured to said shaft and movable therewith adapted to receive the nuts to be cooked, to support them in said liquid while being cooked, to withdraw them from the liquid and effect their discharge from the machine; and means for effecting said relative movement of said tank and shaft.

In testimony whereof we affix our signatures at Somersworth, New Hampshire, this 29th day of November, 1926.

ADELARD G. DESCHENES.
EUGENE A. BRUNELLE.